US007880930B2

(12) United States Patent
Zhang et al.

(10) Patent No.: US 7,880,930 B2
(45) Date of Patent: Feb. 1, 2011

(54) REDUCING PRINTHEAD PROCESS COLOR NON-UNIFORMITIES IN A DIRECT MARKING DEVICE

(75) Inventors: Yeqing Zhang, Penfield, NY (US); Howard A. Mizes, Pittsford, NY (US); Meng Yao, West Linn, OR (US); Susan J. Zoltner, Newberg, OR (US)

(73) Assignee: Xerox Corporation, Norwalk, CT (US)

( * ) Notice: Subject to any disclaimer, the term of this patent is extended or adjusted under 35 U.S.C. 154(b) by 411 days.

(21) Appl. No.: 12/122,762

(22) Filed: May 19, 2008

(65) Prior Publication Data

US 2009/0284762 A1 Nov. 19, 2009

(51) Int. Cl.
H04N 1/60 (2006.01)
H04N 1/46 (2006.01)
G03F 3/08 (2006.01)
G06K 9/00 (2006.01)
G06K 9/40 (2006.01)

(52) U.S. Cl. .................. 358/1.9; 358/504; 358/521; 358/3.26; 358/520; 358/535; 358/518; 358/3.23; 382/162; 382/167; 382/165; 382/275; 382/112

(58) Field of Classification Search .............. 358/1.9, 358/504, 521, 3.26, 520, 535, 518, 3.23; 382/162, 167, 165, 275, 112
See application file for complete search history.

(56) References Cited

U.S. PATENT DOCUMENTS 6,300,968 B1  10/2001  Kerxhalli et al.
7,315,394 B2 *  1/2008  Klassen et al. ............. 358/1.9
7,505,173 B2 *  3/2009  Viturro et al. .............. 358/1.9
2006/0061782 A1  3/2006  Yao
2006/0061783 A1  3/2006  Yao
2007/0003109 A1 *  1/2007  Wu et al. .................... 382/112
2007/0035748 A1  2/2007  Zhang et al.
2007/0035749 A1  2/2007  Zhang et al.

* cited by examiner

*Primary Examiner*—Charlotte M Baker
(74) *Attorney, Agent, or Firm*—Philip E. Blair; Fleit Gibbons Gutman Bongini & Bianco P.L.

(57) ABSTRACT

What is disclosed is a novel system and method for reducing process color banding due to printhead non-uniformities in a direct marking device. In one example, a first measurement of a printhead spatial non-uniformity is obtained along a first line in a color space which produces a spatial uniformity when a target primary color is printed alone. A first spatial tone reproduction curve is generated. A second measurement of the printhead spatial non-uniformity is obtained along a second line in color space in a coverage area of a process color which maximally changes a halftone structure of the target primary color. A second spatial TRC is generated. The first and second spatial TRCs are combined using a weighted average which balances the primary and process colors. A modified spatial TRC is generated. The printhead is adjusted at a location of the target primary color according to the modified spatial TRC.

18 Claims, 5 Drawing Sheets

REDUCING PRINTHEAD PROCESS COLOR NON-UNIFORMITIES IN A DIRECT MARKING DEVICE

TECHNICAL FIELD

The present invention is directed to systems and methods for reducing process color banding effects caused by printhead non-uniformities in direct color marking devices such as ink-jet or solid-ink.

BACKGROUND

In today's business and scientific world, color has become essential as a component of communication. Color facilitates the sharing of knowledge and ideas. Companies involved in the development of digital color printing engines are continuously looking for ways to improve the total image quality of their products. One element that affects image quality is the ability to consistently produce the same quality image output on a printer from one day to another. Users have become accustomed to printers and copiers that produce high quality color and gray-scaled output. Users expect to be able to reproduce a color image with consistent quality on any compatible marking device. There is a commercial need for efficiently maintaining print color predictability and image reproduction quality, particularly as electronic marketing has placed more importance on the accurate representation of merchandise in illustrative print or display media.

In conventional marking devices, quality defects appear in a marked image due to various factors. For example, changes in the optical density introduced by differences in laser/LED bar intensities, subsystem non-uniformities, donor roll reload, and the like can lead to image quality defects. Additionally, spatial non-uniformity errors, e.g., a situation in which pixels in one part of an image that have been defined as a certain color appear different from pixels in another part of the image that have been defined as the same color, are also present. Wire history, wire contamination, charging subsystem variations and photoreceptor variations are among the root causes for spatial non-uniformity errors in images produced by xerographic printers.

Spatial non-uniformity errors can be addressed by modifying hardware or hardware operations. For example, in LED bars, exposure variations can be minimized by measuring the output of the LED elements and adjusting their duty cycle and/or intensity to ensure that all the elements have the same output. In laser exposure systems, similar duty cycle adjustments can be performed to minimize the exposure-related non-uniformities. Furthermore, routine cleaning of wires to remove contamination helps to reduce wire history-related non-uniformities.

Direct marking printers, such as ink jet printers, can produce images with banding due to a variation in drop mass from nozzle to nozzle in the printhead of the marking engine. One aspect of a direct marking process is that the degree of banding depends on the screen used in writing a particular gray level. For example, the banding arising from a 1 on 1 off ladder chart will be different from the banding resulting from a 50% error diffused screen. One cause of this difference is drop coalescence, i.e., drops jetting one after another or adjacent to each other in different pixel columns may coalescence. The tendency to coalesce depends on the drop's mass. One screen may produce many regions where large drops coalesce while another screen may not, so these two screens can have a different degree of banding.

When primary colors are combined to form secondary colors or process black, intensity or hue banding may still appear due to a change in dot pattern used for any given primary color when it is part of a secondary color. This pattern change may be intentional and can result from a desire to avoid placing primary color dots on top of each other when forming secondary colors.

Accordingly, what is needed in this art are increasingly sophisticated systems and methods which reduce process color banding caused by printhead non-uniformities in direct color marking devices.

BRIEF SUMMARY

What is provided is a novel system, method, and computer program product for reducing process color banding due to printhead non-uniformities in direct color marking devices. The present method reduces printhead process color non-uniformities by modifying the generated spatial tone reproduction curves to compromise between primary and process color banding.

In one example embodiment, a first measurement of a printhead spatial non-uniformity is performed along a first line in a color space which produces a spatial color uniformity when a target primary color is printed alone. The target primary color is defined as the amount of color separation for which the non-uniformity needs to be measured for subsequent calculation of the spatial tone reproduction curve. Image processing is used to extract the target primary color uniformity in the presence of non-target primary colors. A first spatial tone reproduction curve is generated from the first measurement. A second measurement of the printhead spatial non-uniformity is performed along a second line in color space in a coverage area of a secondary color which maximally changes a halftone structure of the target primary color. The second measurement of the printhead spatial non-uniformity involves halftoning individual separations of the process color. The second measurement is performed with an image capture device that illuminates the spatial uniformity of the target primary color with different colors and a response of the image capture device for the different colors is combined to extract the spatial uniformity of one of the plurality of colors in the spatial uniformity target. Alternatively, the second measurement may be made by printing only the printhead of the color being monitored. A second spatial tone reproduction curve is generated from the second measurement. The first and second spatial tone reproduction curves are combined to produce a modified spatial tone reproduction curve using a weighted average which balances the primary and process colors. The printhead of the color marking device can thereafter be adjusted at a location of the target primary color according to the modified spatial tone reproduction curve.

The foregoing and other features and advantages will be apparent from the following more particular description of the preferred embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is provided are a system and method for reducing process color banding due to printhead non-uniformities in direct color marking devices. The present method reduces printhead process color non-uniformities by modifying the spatial tone reproduction curves to compromise between primary and process color banding.

It should be understood that one of ordinary skill in this art would be readily familiar with many facets of color science such as color space, spatial tone reproduction curves, halftoning, and color device calibration, and other related techniques commonly found in the color science arts. One of ordinary skill would also be knowledgeable about computer science and software and programming systems and methods sufficient to implement the functionality described herein in their own specific hardware environments without undue experimentation.

A color gamut refers to a set of colors that can be produced by a printing device or via a display device. A color gamut (or gamut) can alternatively refer to a subset of colors that are present in a print job or a portion of a print job such as, for example, a section, a page, an image, an object, or the like. A color transformation refers to the process of translating a print job or a portion thereof that is represented in an input color space to an output color space. In conventional color management systems, a color transformation converts each input color space for a print job, on a color by color basis, into an output color space using mathematical algorithms represented by multiple color profiles: a first color profile converts an input color space to a standardized color space, and a second color profile converts the standardized color space to an output color space. The second color profile may be replaced with a color gamut error profile which converts the standardized color space to a scalar value or a vector representing an amount by which a color is out-of gamut. The mathematical algorithms of the color profiles for a color transformation may be convolved to produce a single mathematical algorithm to increase efficiency.

The term "process color", as used herein, refers to all colors that are a combination of primary colors and includes secondary colors (with 2 primary colors involved) and process black (with the same amount of 3 primary colors involved). Although the present method is described in relation to secondary colors, it should be understood that the teachings hereof equally apply to process colors.

The term "printhead" means the element of a printer or color marking device which applies the mark or image to the print media surface. There are many different types of printheads such as thermal printheads which are capable of printing over 300 dots-per-inch (dpi) (12 dots per mm). One skilled in this art would readily appreciate the diversity of various printheads used by color marking devices.

The term "solid ink printers", also referred to as phase-change printers are a type of thermal transfer printer which uses solid sticks of CMYK colored ink (similar in consistency to candle wax), which are melted and fed into a piezo crystal operated print-head. Solid ink printers are commonly used as color office printers, and are very good at printing on transparencies and other non-porous media. Solid ink printers can produce excellent results and are manufactured by the assignee hereof.

Figure 1:
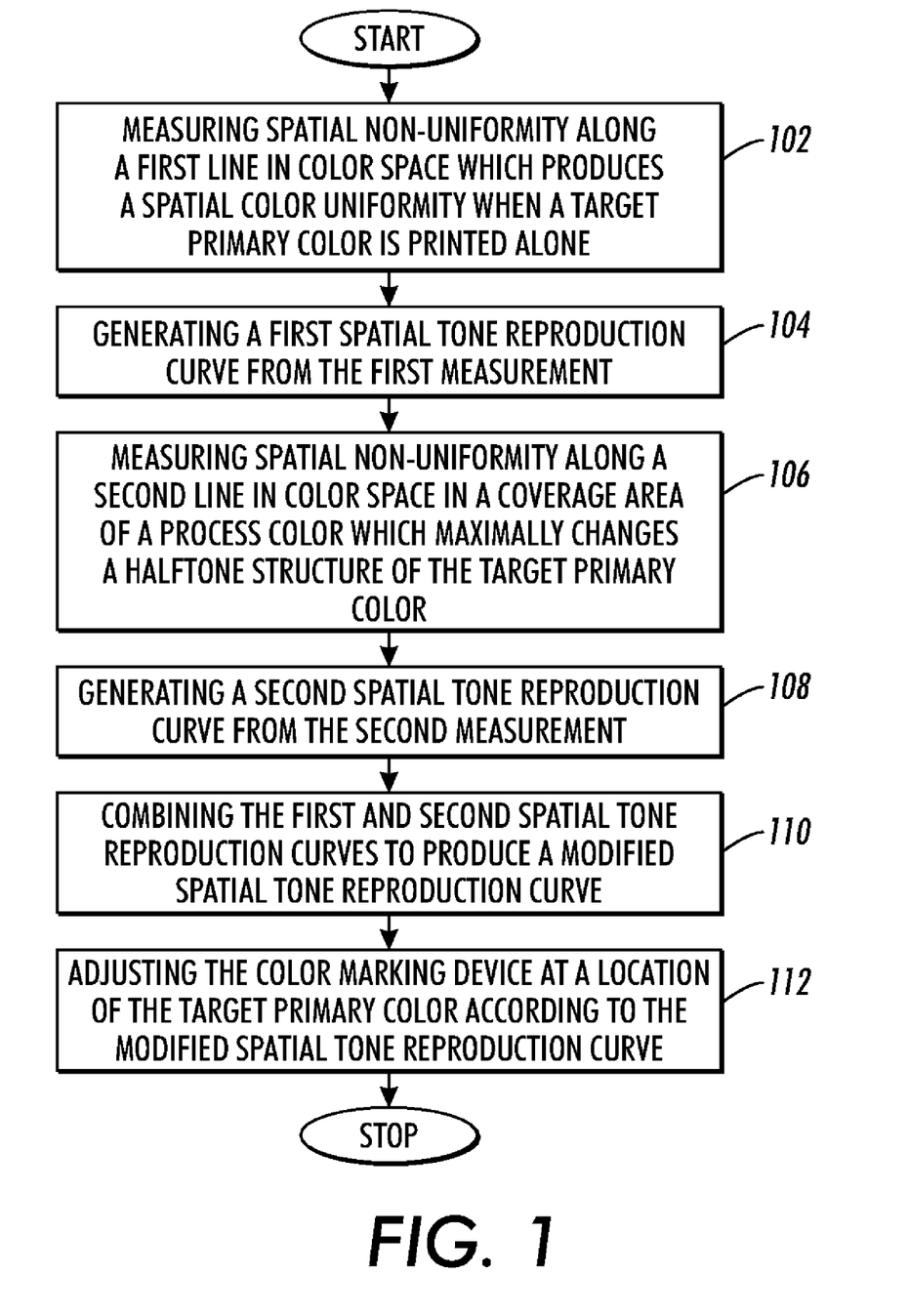
FIG. 1 is a flow diagram illustrating one example embodiment of the present method for compensating for process color banding due to printhead non-uniformities in a color marking device.

Reference is now being made to FIG. 1 which illustrates a flow diagram of one embodiment of the present method for compensating for process color banding effects due to printhead non-uniformities in a color marking device.

In one example embodiment, at step 102, a first measurement of a printhead spatial non-uniformity is performed along a first line in a color space which produces a spatial color uniformity when a target primary color is printed alone. The target primary color is defined as the amount of color separation for which the non-uniformity needs to be measured for subsequent calculation of the spatial tone reproduction curve. Image processing is used to extract the target primary color uniformity in the presence of non-target primary colors. At step 104, a first spatial tone reproduction curve is generated from the first measurement.

At step 106, a second measurement of the printhead spatial non-uniformity is performed along a second line in color space in a coverage area of a secondary color which maximally changes a halftone structure of the target primary color. The second measurement of the printhead spatial non-uniformity is performed with an image capture device that illuminates the spatial uniformity of the target primary color with different colors and a response of the image capture device for the different colors is combined to extract the spatial uniformity of one of the plurality of colors in the spatial uniformity target. The second measurement may further involve the steps of halftoning individual color separations of the process color and then printing the process color separations using only the printhead of the target primary color. At step 108, a second spatial tone reproduction curve is generated from the second measurement.

At step 110, the first and second spatial tone reproduction curves are combined to produce a modified spatial tone reproduction curve. The spatial tone reproduction curves are combined, in one embodiment, using a weighted average which balances the primary and process colors. One skilled in this art would readily understand the combining of the spatial tone reproduction curves using a weighted average which balances the primary and process colors according to their own color management needs. The modified spatial tone reproduction curve may be equal to the first spatial tone reproduction curve multiplied by a scaling factor that is a function of the amount of the other colorant in a secondary color.

At step 112, the printhead of the color marking device can thereafter be adjusted at a location of the target primary color according to the modified spatial tone reproduction curve. Various techniques for adjusting a printhead at a color location according to a spatial tone reproduction curve is well known in this art and may very well depend on the design of the color marking device of a color management system. As such, a further discussion as to adjusting a particular printhead of a particular color marking device has been omitted herein. One skilled in the color science and color management arts would readily appreciate the end uses of the modified spatial tone reproduction curves produced hereby.

The color uniformity of the target primary color in a uniform strip can be determined as follows. A uniform strip of a process color is printed in which the target primary color is contained. The printed uniform strip is scanned using an image processing device such as, for example, a flatbed scanner or a linear array sensing device. The scanned image of the printed uniform strip, consisting of 2 or more color separations, is manipulated by combining individual color channels of the imaging sensor used to process the image such that the dominant response of each pixel of the sensing device is due to variations in density (intensity variations) of the target primary color. The color uniformity of the target primary color is calculated using the dominant response of each pixel. The spatial tone reproduction curves are generated from the calculated target primary color uniformity.

Alternatively, the color uniformity of the target primary color in a strip of any color can be determined in an embodiment wherein only the desired response (the target primary color) is printed as it would appear in a secondary color. An error diffusion technique such as, for example, a vector halftoning process, is used to calculate the dot screen (dither pattern) for all primary colors in a process color. Instead of printing all the colors and making a uniform strip of the intended color to measure, only the target primary color is used. A uniform strip of the target primary color is then printed for the dot screen that would normally be used in the process color. An image of the uniform strip of the target primary color is captured by, for example, a scanning device or a linear array sensor. The uniformity of the target primary color in the cross process direction is calculated directly from the captured image. The spatial tone reproduction curves are generated from the calculated target primary color uniformity.

It should be understood that the flow diagram of the method of FIG. 1 is intended to be illustrative. Other operations, for example, may be added, modified, enhanced, condensed, integrated, or consolidated. Variations thereof are intended to fall within the scope of the appended claims.

Figure 2:
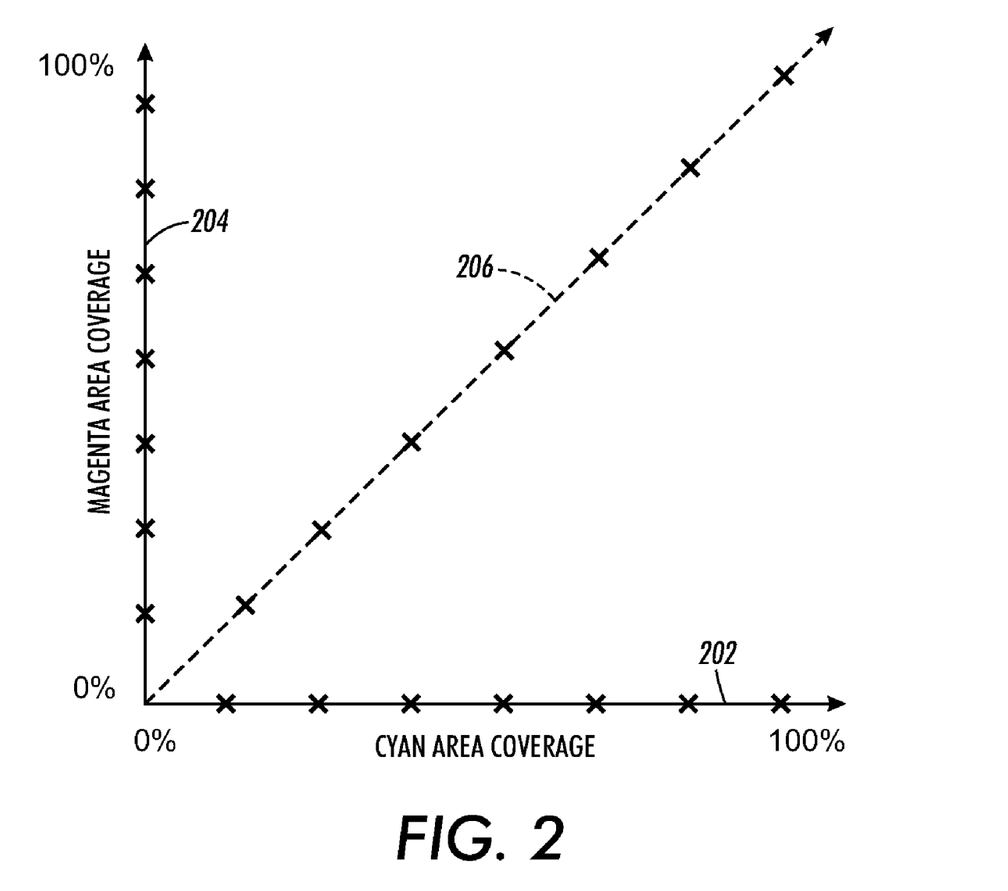
FIG. 2 graphically illustrates a low memory usage embodiment wherein the spatial tone reproduction curves are calculated from strip uniformities measured only along a primary and secondary axis in color space where coverages of both primary colors have the same area coverage.

FIG. 2 graphically illustrates a low memory usage embodiment wherein the spatial tone reproduction curves are calculated from strip uniformities measured only along a primary and secondary axis in color space where coverages of both primary colors have the same area coverage. The x-axis denotes the area coverage of cyan which, in the instance shown, is considered the non-target primary color because cyan has the same halftoning pattern in primary cyan and blue, which includes same area coverage of cyan and magenta. The y-axis denotes the area coverage of magenta which, in the instance shown, is considered to be the target primary color because magenta halftoning pattern varies in primary magenta and blue. Shown are three spatial tone reproduction curves calculated along the cyan axis 202, the magenta axis 204, and the blue axis 206. Note the equal area coverages of cyan and magenta. The x's denote the area coverages of cyan and magenta at which the uniformity strip was printed and measured. Such an embodiment is useful in those systems where memory constraints are an issue.

The spatial tone reproduction curves generated by the teachings hereof are used to calibrate a color marking device known in the arts. Preferably, there is sufficient memory and processing capability in the image path to apply a different spatial tone reproduction curve for each color. Using both the primary and secondary spatial tone rendering curves can consume limited resources in some print job environments. Under some conditions, situations may arise where the process color banding is related in a consistent way to the primary color banding. For example, it may be for the halftone screen resulting from the vector process wherein the banding amplitude having the similar spatial profile is amplified. The existence and degree of this amplification can be determined from the uniformity measurements of the primary and secondary colors. If such a relationship is found to exist then, rather than applying a spatial tone reproduction curve which is dependent on the color, a single spatial tone reproduction curve will be applied to each primary color depending on the gray level and multiplied by a scaling factor that is a function of the amount of the other colorant in the secondary color.

Figure 3:
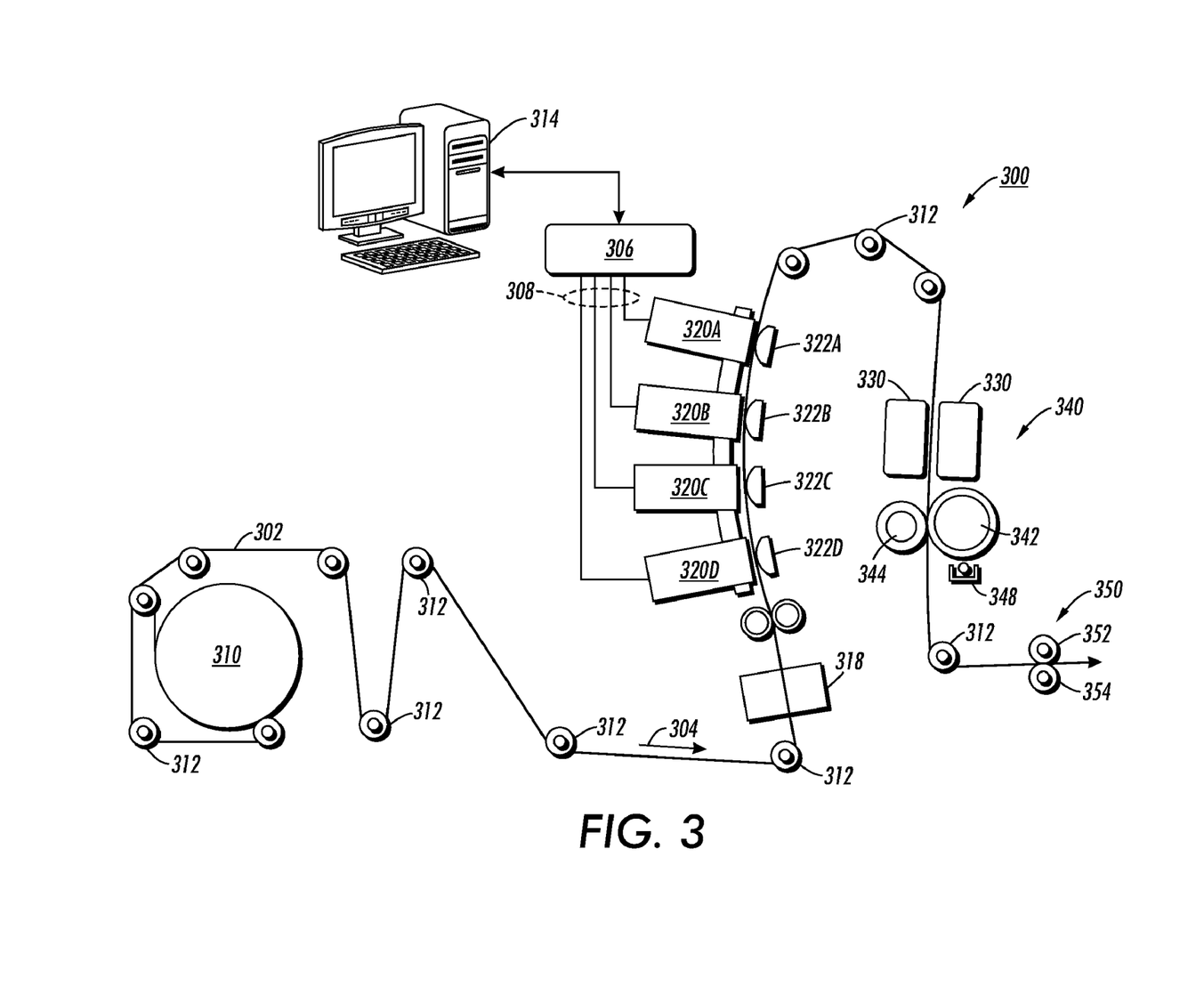
FIG. 3 illustrates a simplified elevational view of a direct-to-sheet, continuous-web color marking device wherein one or more aspects of the present method will likely find their intended uses to reduce process color banding due to printhead non-uniformities.

Reference is now being made to FIG. 3 which illustrates a simplified elevational view of a direct-to-sheet, continuous-web color marking device wherein one or more aspects of the present method will likely find their intended uses to reduce process color banding due to printhead non-uniformities.

In the embodiment shown, a substantially continuous web of substrate 302, such as, for example, paper, plastic, or other print material, supplied on a spool 310 is unwound as needed, propelled by a variety of motors not shown. A set of rolls, each at 312, controls the tension of the unwinding web 302 as the substrate moves along a path in the process direction 304. Along the path, there is provided a preheater 318, which brings the web to an initial predetermined temperature. The preheater can rely on contact, radiant, conductive, or convective heat to bring the web W to a target preheat temperature, in one practical embodiment, of about 30° C. to about 70° C.

The web 302 moves through a printing station which, in the embodiment shown, includes printheads 320A, 320B, 320C, and 320D. Each printhead extends across the width of the web and is capable of placing ink of a primary color onto the moving substrate to form a full-color image. The placement of the individual colors from the printheads is based on the image data sent to each printhead from a control unit 306 through the image path, shown collectively at 308. On other embodiments, multiple printheads are provided for each primary color and can each be arranged in a linear array. The function of each color printhead, in the embodiment of multiple printheads provided for each color, can be divided among multiple distinct printheads located at different locations along the process direction or the printheads or portions thereof can be mounted movably in a direction transverse to the process direction 304, such as for spot-color applications.

In one embodiment, the control unit 306 incorporates various aspects of the present method for reducing banding in a color marking device. The present method can be implemented in hardware or software using known or later developed systems, structures, or devices. The teachings hereof may also be implemented as a software routine embedded on a personal computer 314 or as a resource residing on a server or workstation in communication with control unit 306. The methods provided herein can also be implemented by physical incorporation into an image processing, image reproduction, print/copy system, or color management system integrated in whole or in part with any of color marking device 300. Various aspects of the present method may be performed in either the control unit 306 or in the computer system 314. For instance, in one embodiment, the control unit 306 performs the function of measuring the spatial non-uniformity of each of the printheads 320A-D of the color marking device 300, and the computer system 314 performs the function of generating the spatial tone reproduction curves, as claimed, and further combining the generated spatial tone reproduction curves to produce the modified spatial tone reproduction curves used to calibrate the printheads of the color marking device at the color locations of said target primary color. It should be clearly understood that some or all of the functionality of the present system and method can be performed in either of the control unit 306 or the computer system 314 or any combination thereof.

It should also be understood that one or more aspects of the teachings hereof can be implemented on in hardware such as a micro-processor or micro-controller, an ASIC or other integrated circuit, a DSP, an electronic circuit such as a discrete element circuit, a programmable device such as a PLD, PLA, FPGA, PAL, PDA, and the like. In general, any hardware capable of implementing one or more elements of the flow diagrams provided herewith, or portions thereof, can be used. Portions of the present method may also be implemented partially or fully in such hardware devices in conjunction with machine executable instructions or using object or object-oriented software development environments that provide portable source code that can be used on a variety of computer, workstation, server, network, or other hardware platforms. One or more of the capabilities hereof can be emulated in a virtual environment as provided by an operating system, specialized programs, or from a server.

With further reference being made to the color marking device of FIG. 3, associated with each primary color printhead 320A-D is a backing member 322A-D arranged substantially opposite the printheads on the other side of web 302 to position the web so that the gap between the printhead and the print material remains at a constant predetermined distance. As the partially-imaged web moves to receive inks of various colors, it is required that the temperature of the web be maintained to within a given range. A heater (not shown) causes the web surface to reach a predetermined temperature such as, for example, between 40° C. to 65° C., depending on the characteristics of the inks used. In other embodiments, each backing member 322A-D includes heating elements. The combined actions of a preheater plus heating elements maintains the web surface at the desired temperature while receiving ink from the various printheads. Ink is jetted at a temperature higher than the receiving web's temperature. Temperature sensors (not shown) associated with the web. The various backer members can be controlled individually using data from the adjacent printhead, as well as from other printheads.

In the embodiment shown, the ink directed onto web 302 is a "phase-change ink" such that the ink is substantially solid at room temperature and substantially liquid when initially jetted onto the print material substrate. Common phase change inks are typically heated to about 100° C. to 140° C. and are in a liquid phase upon being jetted onto the substrate. Generally, liquid ink cools quickly upon surface contact. A series of midheaters 330 help bring the ink placed on the web 302 to a temperature suitable for desired ink properties when the ink on the web. In one embodiment, a useful temperature for the midheater is about 35° C. to 80° C. The midheater has the effect of equalizing the ink and substrate temperatures to within about 15° C. of each other. Lower ink temperature gives less line spread. Higher ink temperatures may cause the image to be visible from the other side of the print media. The midheater adjusts substrate and ink temperatures to 0° C. to 20° C. above the temperature of the spreader, which will be described below.

Following the midheaters, a spreader 340 applies a predetermined pressure, and in some implementations, heat, to the web. The function of the spreader is to take isolated droplets of ink on the web and smear them out to make a continuous layer by pressure and alternatively heat, so that spaces between adjacent droplets of ink are filled. The spreader 340 may also improve image permanence by increasing ink layer cohesion and/or increasing the ink-web adhesion. In one embodiment, the midheater 330 and spreader 340 are combined in a single unit. The spreader further includes an image-side roll 342 and a pressure roll 344 that apply heat and pressure to the web. Either roll can include heat elements not shown. In one embodiment, the roll temperature in the spreader is maintained at about 55° C. Generally, a lower roll temperature gives less line spread. A roll temperature higher than about 57° C. causes ink to offset to the roll thereby causing imperfections in the gloss. In one embodiment, nip pressure between the rolls is set between 500 and 2000 psi. Lower nip pressure gives less line spread while higher nip pressure reduces roll life. The spreader also includes station 348 suitable for cleaning and/or applying a layer of lubricant or other material to the roll surface. Such a station coats the surface of the spreader with a lubricant such as, for example, an amino silicone oil. Only small amounts of oil are required.

A glosser 350 applies a predetermined combination of temperature and pressure to obtain a desired amount of gloss on the ink that has just been spread by spreader. In one embodiment, the controlled temperature at the glosser is about 30° C. to 70° C. The glosser surface may have a texture that the user desires to impress upon the web surface. The glosser includes an image-side roll 352 and a pressure roll 354 forming a nip through which the web passes. In various applications, elastomeric or rubbery pressure rolls of one or more layers, with effective elastic from about 50 MPa to 200 MPa, are provided. In one implementation, detailed and independent control of the respective temperatures associated with spreader and glosser enables gloss adjustment given particular operating conditions and desired print attributes.

It will be recognized by those experienced in this art that the temperatures and pressures effective for spreading ink of a given formulation will depend on the ink's thermal properties. If solvent-based or water-based inks were used (i.e., not phase-change ink) in the given implementation, the ink would not necessarily land on the media as a drop or droplet but will generally spread out on its own and thus form a smooth layer, rendering, for example, the effect of the spreader and other elements uncertain. Similarly, teachings involving placement of dye or inks on a substantially porous substrate such as woven or knit fabric cloth. Another system wherein multiple images are built up on a single photoreceptor is disclosed in U.S. Pat. No. 6,300,968 assigned to Xerox, which is incorporated herein in its entirety by reference.

Figure 4:
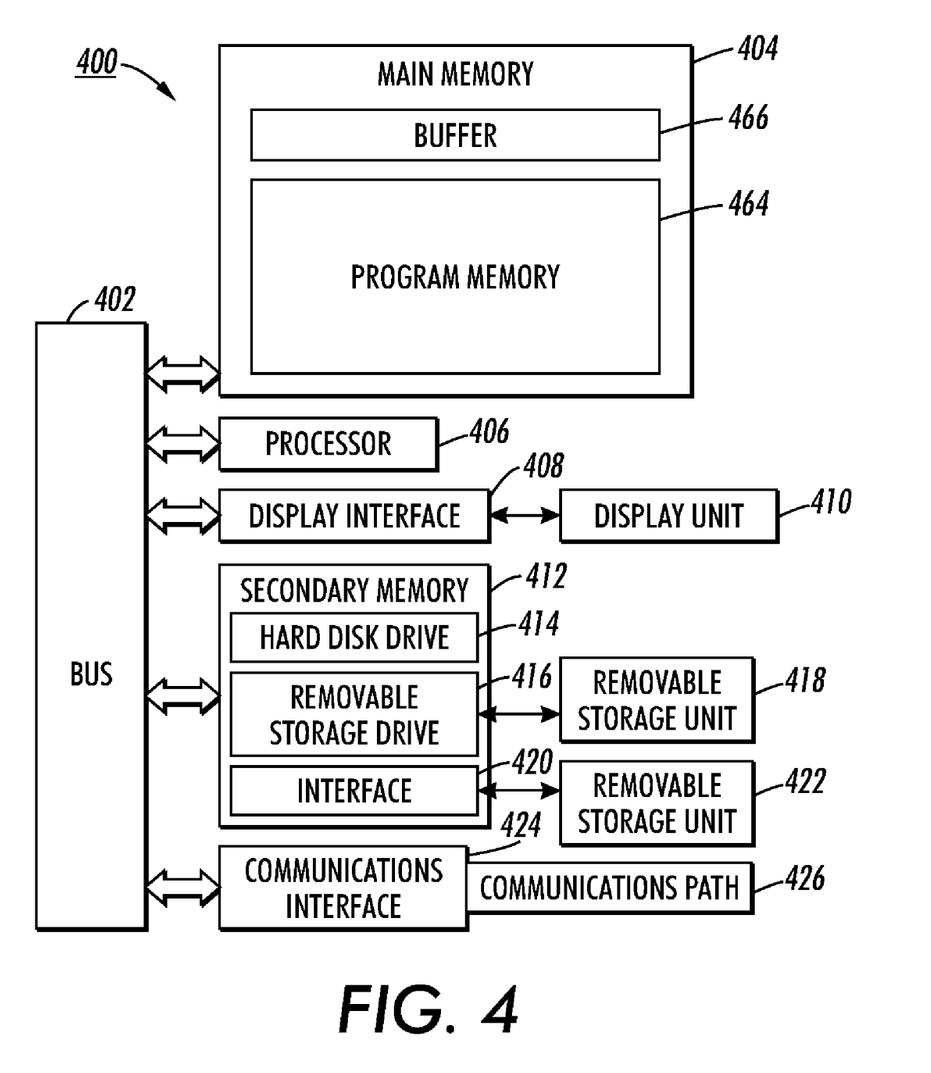
FIG. 4 which illustrates a block diagram of one embodiment of a computer system useful for implementing one or more embodiments, features, or enhancements to the present method as illustrated in the flow diagram of FIG. 1.

Reference is now being made to FIG. 4 which illustrates a block diagram of one embodiment of a computer system useful for implementing the method illustrated in the flow diagram of FIG. 1. The system of FIG. 4 is one which may be implemented in one or both of the computer system 314 or the control unit 306 of FIG. 3.

The computer system 400 includes processor 406 capable of executing machine executable program instructions and is in communication with bus 402. The computer system also includes a main memory 404 to store machine readable instructions containing some or all of the present method hereof to be executed by the processor. The main memory is capable of storing data and may include random access memory (RAM) to support reprogramming and flexible data storage. Main memory may include buffer 466 to store data and a program memory 464 that includes, for example, executable programs that implement the present method as described in the flow diagram of FIG. 1. The program memory is capable of storing data in the buffer 466. The computer system further includes a display interface 408 that forwards data from communication bus 402 to display 410. The computer system also includes a secondary memory 412. The secondary memory may include, for example, a hard disk drive 414 and/or a removable storage drive 416 which reads and writes to removable storage unit 418, such as a floppy disk, magnetic tape, optical disk, etc., that stores computer software and/or data. The secondary memory may also include other mechanisms for allowing computer program instructions to be loaded into the computer system such as, for example, a removable storage unit 422 adapted to exchange data through interface 420. Examples of such other mechanisms include a program cartridge and cartridge interface (such as those implemented in video game devices), a removable memory chip (such as an EPROM, or PROM) and associated socket, and other removable storage units and interfaces 420 which allow software and data to be transferred from the removable storage unit to the computer system. The computer system includes a communications interface 424 which acts as both an input and an output to allow software and data to be transferred between the computer system and external devices. Examples of a communications interface include a modem, a network interface (such as an Ethernet card), a communications port, a PCMCIA slot and card, etc. Computer programs may also be stored in secondary memory. Such computer programs, when executed, enable the computer system to perform the features and capabilities provided herein. Software and data transferred via the communications interface are in the form of signals which may be, for example, electronic, electromagnetic, optical, or other signals capable of being received by communications interface. Computer programs may also be received via the communications interface. These signals are provided to communications interface via a communications path (i.e., channel) 426 which carries signals and may be implemented using wire, cable, fiber optic, phone line, cellular link, RF, or other communications channels.

Figure 5:
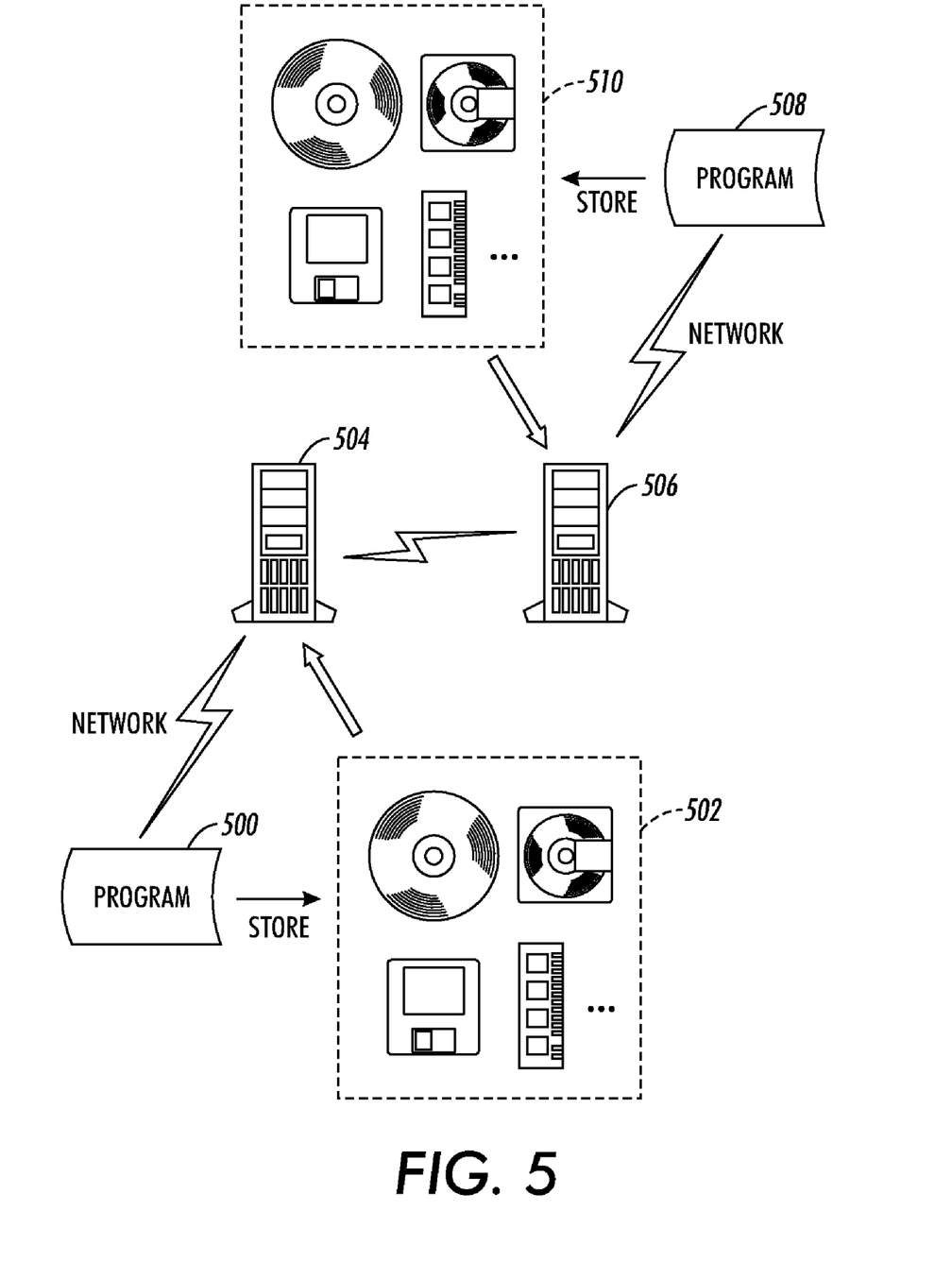
FIG. 5 is an explanatory diagram illustrating one example of a computer storage medium storing machine readable program code containing instructions which, when mounted on a computer system, cause a computer to perform one or more steps of the present method.

Reference is now being made to FIG. 5 which is an explanatory diagram illustrating one example of a computer readable storage medium capable of storing machine readable instructions which, when mounted on a computer system such as system 314 of FIG. 3, cause the computer system to perform one or more steps of the present method. The machine readable instructions may be modified by one computer system and transferred to another computer system. Alternatively, the machine readable instructions may be implemented, in whole or in part, on the control unit 306 of FIG. 3.

One or more computer program instructions 500 for carrying out the present method are loaded on computer-readable storage media 502 which includes media such as optical disks (CD-ROM etc.), magnetic disks, magnetic cards, memories (including IC cards and memory card). The storage media stores the machine readable program instructions for sale, transport, and storage by changing magnetic, optical, and/or electric energy states in response to program description instructions having been transferred to the media. The storage medium can then be mounted on computer system 504 and transferred or otherwise communicated to computer system 506. The program instructions can then be off-loaded to another program 506, in original form or modified, including data, and stored on storage media 510. Both of the computer systems include processors capable of executing program instructions represented by the flow diagram of FIG. 1.

Terms such as, computer program medium, computer readable medium, computer executable medium, and computer usable medium are used herein to generally refer to a machine readable media such as main memory, secondary memory, removable storage device such as a hard disk, and communication signals. Such computer program products are means for providing instructions and/or data to the computer system or device for implementing the present method as illustrated in the flow diagram of FIG. 1.

The computer readable medium stores data, instructions, messages packets, or other machine readable information. The computer readable medium may include non-volatile memory, such as a floppy disk, hard drive, memory, ROM, RAM, flash memory, disk memory, and other permanent storage useful, for example, for transporting information such as data and machine readable program instructions. It may further include a CD-ROM, DVD, tape, cassette, or other digital or analog media, capable of having embodied thereon one or more logical programming instructions or other machine executable codes or commands that implement and facilitate the function, capability, and methods disclosed herein. The computer readable medium may additionally comprise information in a transitory state medium such as a network link or a network interface which may include a wired network or a wireless network which allows a computer to read such computer readable information.

It should be understood that one or more aspects of the present method are intended to be incorporated in an article of manufacture, including one or more computer program products. The article of manufacture may be included on at least one storage device readable by a machine architecture, xerographic, color management, or other image processing system capable of executing program instructions. The article of manufacture may be included as part of a xerographic system, color management system, an operating system, a software program, a plug-in. Such an article of manufacture may further be shipped, sold, leased, or otherwise provided separately either alone or as part of an add-on, update, upgrade, or product suite by the present assignee or a licensee thereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for reducing process banding in a color marking device, the method comprising:

performing a first measurement of spatial non-uniformity of a color marking device along a first line in a color space which produces a spatial color uniformity when a target primary color is printed alone;

generating a first spatial tone reproduction curve from said first measurement;

performing a second measurement of spatial non-uniformity of said color marking device along a second line in said color space in a coverage area of a process color which maximally changes a halftone structure of said target primary color;

generating a second spatial tone reproduction curve from said second measurement;

combining said first and second spatial tone reproduction curves to produce a modified spatial tone reproduction curve; and calibrating said color marking device at a location of said target primary color according to said modified spatial tone reproduction curve.

2. The method of claim 1, where said second measurement of said spatial non-uniformity is performed with an image capture device that illuminates said spatial color uniformity of said target primary color with different colors.

3. The method of claim 2, where a response of said image capture device for said different colors is combined to extract said spatial color uniformity of one of the plurality of colors in said spatial color uniformity of said target primary color.

4. The method of claim 1, where said second measurement of said spatial non-uniformity comprises:
halftoning individual separations of said process color; and
printing said halftoned individual separations using only said target primary color.

5. The method of claim 1, wherein said first and second spatial tone reproduction curves are combined using a weighted average.

6. The method of claim 1, wherein said modified spatial tone reproduction curve is equal to said first spatial tone reproduction curve multiplied by a scaling factor.

7. A system for reducing process banding in a color marking device, the system comprising:
a non-transitory storage medium capable of storing data; and
a processor in communication with said storage medium, said processor capable of executing a machine readable instruction for performing the method of:
performing a first measurement of spatial non-uniformity of a color marking device along a first line in a color space which produces a spatial color uniformity when a target primary color is printed alone;
generating a first spatial tone reproduction curve from said first measurement;
performing a second measurement of spatial non-uniformity of said color marking device along a second line in said color space in a coverage area of a process color which maximally changes a halftone structure of said target primary color;
generating a second spatial tone reproduction curve from said second measurement;
combining said first and second spatial tone reproduction curves to produce a modified spatial tone reproduction curve; and
calibrating said color marking device at a location of said target primary color according to said modified spatial tone reproduction curve.

8. The system of claim 7, where said second measurement of spatial non-uniformity is performed with an image capture device that illuminates said spatial color uniformity of said target primary color with different colors.

9. The system of claim 8, where a response of said image capture device for said different colors is combined to extract said spatial color uniformity of one of the plurality of colors in said spatial color uniformity of said target primary color.

10. The system of claim 7, where said second measurement of spatial non-uniformity comprises:
halftoning individual separations of said process color; and
printing said halftoned individual separations using only said target primary color.

11. The system of claim 7, wherein said first and second spatial tone reproduction curves are combined using a weighted average.

12. The system of claim 7, wherein said modified spatial tone reproduction curve is equal to said first spatial tone reproduction curve multiplied by a scaling factor.

13. A computer program product for reducing process banding in a color marking device, the computer program product comprising:
a non-transitory computer readable storage medium storing instructions that, when executed on a computer, cause the computer to perform a method comprising:
performing a first measurement of spatial non-uniformity of a color marking device along a first line in a color space which produces a spatial color uniformity when a target primary color is printed alone;
generating a first spatial tone reproduction curve from said first measurement;
performing a second measurement of spatial non-uniformity of said color marking device along a second line in said color space in a coverage area of a process color which maximally changes a halftone structure of said target primary color;
generating a second spatial tone reproduction curve from said second measurement;
combining said first and second spatial tone reproduction curves to produce a modified spatial tone reproduction curve; and
calibrating said color marking device at a location of said target primary color according to said modified spatial tone reproduction curve.

14. The computer program product of claim 13, where said second measurement of spatial non-uniformity is performed with an image capture device that illuminates said spatial color uniformity of said target primary color with different colors.

15. The computer program product of claim 14, where a response of said image capture device for said different colors is combined to extract said spatial color uniformity of one of the plurality of colors in said spatial color uniformity of said target primary color.

16. The computer program product of claim 13, where said second measurement of spatial non-uniformity comprises:
halftoning individual separations of said process color; and
printing said halftoned individual separations using only said target primary color.

17. The computer program product of claim 13, wherein said first and second spatial tone reproduction curves are combined using a weighted average.

18. The computer program product of claim 13, wherein said modified spatial tone reproduction curve is equal to said first spatial tone reproduction curve multiplied by a scaling factor.

* * * * *